US008789102B2

(12) United States Patent
Pickelsimer et al.

(10) Patent No.: US 8,789,102 B2
(45) Date of Patent: *Jul. 22, 2014

(54) PROVIDING A CUSTOMIZED USER INTERFACE (75) Inventors: Lisa A. Pickelsimer, Atlanta, GA (US); Anant Patil, Marietta, GA (US); Joshua Musick, Brooklyn, NY (US); Robert Fabricant, Brooklyn, NY (US); David Werner, San Francisco, CA (US); Andrew Zeldis, Brooklyn, NY (US)

(73) Assignee: Cox Communications, Inc., Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/126,165

(22) Filed: May 23, 2008

(65) Prior Publication Data
US 2009/0094643 A1 Apr. 9, 2009

Related U.S. Application Data (63) Continuation-in-part of application No. 11/787,732, filed on Apr. 17, 2007.

(60) Provisional application No. 60/881,888, filed on Jan. 23, 2007, provisional application No. 60/897,341, filed on Jan. 25, 2007, provisional application No. 60/946,790, filed on Jun. 28, 2007, provisional application No. 60/931,698, filed on May 25, 2007.

(51) Int. Cl.
*H04N 7/16* (2011.01)
*G06F 3/048* (2013.01)

(52) U.S. Cl.
USPC ............... 725/42; 725/43; 725/46; 725/47; 725/52

(58) Field of Classification Search
USPC .......................... 725/37–61, 9–21
See application file for complete search history.

(56) References Cited

U.S. PATENT DOCUMENTS 5,565,909 A 10/1996 Thibadeau et al.
5,583,560 A 12/1996 Florin et al.
(Continued)

FOREIGN PATENT DOCUMENTS

JP 2002-218428 8/2002

OTHER PUBLICATIONS

Copending U.S. Appl. No. 12/ 868,801, filed Aug. 26, 2010 entitled "Content Library".

(Continued)

*Primary Examiner* — Benjamin R Bruckart
*Assistant Examiner* — Carmine Malangone
(74) *Attorney, Agent, or Firm* — Merchant & Gould P.C.

(57) ABSTRACT

Systems and methods are disclosed for providing a user interface. First, a first input may be received and a currently displayed programming content may be shrunken. Next, the shrunken programming content may be displayed. Then, in response to the received first input and concurrent with the shrunken programming content, a media guide comprising at least three display elements may be displayed. At least one of the three display elements may be customized for a user. Each one of the three display elements may include a first content element, a second content element, a third content element, a fourth content element, or a fifth content element. The first content element may display available programming channels. The second content element may display programs available on the available programming channels. The third content element may display description information. The fourth content element may display actions that can be taken.

17 Claims, 7 Drawing Sheets

(56) References Cited

U.S. PATENT DOCUMENTS

| | | |
|---|---|---|
| 5,808,662 A | 9/1998 | Kinney et al. |
| 5,812,123 A | 9/1998 | Rowe et al. |
| 5,818,439 A | 10/1998 | Nagasaka et al. |
| 5,861,906 A | 1/1999 | Dunn et al. |
| 6,144,375 A | 11/2000 | Jain et al. |
| 6,188,398 B1 | 2/2001 | Collins-Rector et al. |
| 6,282,713 B1 | 8/2001 | Kitsukawa et al. |
| 6,438,579 B1 | 8/2002 | Hosken |
| 6,615,248 B1 | 9/2003 | Smith ............................ 709/217 |
| 6,754,904 B1 | 6/2004 | Cooper et al. |
| 6,934,963 B1* | 8/2005 | Reynolds et al. ................ 725/39 |
| 6,968,364 B1 | 11/2005 | Wong et al. |
| 6,983,426 B1 | 1/2006 | Kobayashi et al. |
| 7,017,173 B1 | 3/2006 | Armstrong et al. |
| 7,080,139 B1 | 7/2006 | Briggs et al. |
| 7,228,305 B1 | 6/2007 | Eyal et al. |
| 7,246,367 B2 | 7/2007 | Livonen |
| 7,249,366 B1 | 7/2007 | Flavin |
| 7,272,844 B1 | 9/2007 | Bankers et al. |
| 7,290,211 B2 | 10/2007 | Goodwin et al. |
| 7,363,644 B2* | 4/2008 | Wugofski ........................ 725/40 |
| 7,584,214 B2 | 9/2009 | Narahara et al. ............ 707/104.1 |
| 7,596,761 B2 | 9/2009 | Lemay et al. .................. 715/779 |
| 7,669,219 B2 | 2/2010 | Scott, III |
| 7,673,315 B1 | 3/2010 | Wong et al. |
| 7,685,204 B2 | 3/2010 | Rogers |
| 7,698,263 B2 | 4/2010 | Pickelsimer et al. |
| 7,716,376 B1 | 5/2010 | Price et al. |
| 7,877,293 B2 | 1/2011 | Biebesheimer et al. |
| 7,886,327 B2 | 2/2011 | Stevens |
| 7,895,625 B1 | 2/2011 | Bryan et al. |
| 7,904,924 B1 | 3/2011 | de Heer et al. |
| 7,933,789 B2 | 4/2011 | Boland et al. |
| 7,992,163 B1 | 8/2011 | Jerding et al. |
| 8,090,606 B2 | 1/2012 | Svendsen |
| 8,091,032 B2 | 1/2012 | Fischer |
| 8,220,021 B1 | 7/2012 | Look et al. |
| 8,364,013 B2 | 1/2013 | Nijim |
| 8,418,204 B2 | 4/2013 | Pickelsimer et al. |
| 2001/0001160 A1 | 5/2001 | Shoff et al. |
| 2001/0037367 A1 | 11/2001 | Iyer |
| 2002/0007485 A1 | 1/2002 | Rodriguez et al. |
| 2002/0056123 A1 | 5/2002 | Liwerant et al. |
| 2002/0057297 A1 | 5/2002 | Grimes et al. |
| 2002/0069218 A1 | 6/2002 | Sull et al. |
| 2002/0087982 A1 | 7/2002 | Stuart ............................ 725/539 |
| 2002/0120757 A1 | 8/2002 | Sutherland et al. |
| 2002/0124252 A1 | 9/2002 | Schaefer et al. |
| 2002/0128831 A1 | 9/2002 | Ju et al. |
| 2002/0144273 A1 | 10/2002 | Reto |
| 2002/0156852 A1 | 10/2002 | Hughes et al. |
| 2002/0174430 A1* | 11/2002 | Ellis et al. ........................ 725/46 |
| 2002/0194195 A1 | 12/2002 | Fenton et al. ............... 707/104.1 |
| 2002/0199188 A1 | 12/2002 | Sie et al. |
| 2003/0002849 A1 | 1/2003 | Lord |
| 2003/0021582 A1 | 1/2003 | Sawada |
| 2003/0084449 A1 | 5/2003 | Chane et al. |
| 2003/0093790 A1 | 5/2003 | Logan et al. |
| 2003/0093806 A1 | 5/2003 | Dureau et al. |
| 2003/0112467 A1* | 6/2003 | McCollum et al. ........... 358/1.18 |
| 2003/0115592 A1 | 6/2003 | Johnson |
| 2003/0154477 A1 | 8/2003 | Hassell et al. |
| 2003/0156827 A1 | 8/2003 | Janevski |
| 2003/0177497 A1 | 9/2003 | Macrae et al. |
| 2003/0206710 A1 | 11/2003 | Ferman et al. |
| 2003/0208763 A1 | 11/2003 | McElhatten et al. |
| 2003/0220100 A1 | 11/2003 | McElhatten et al. |
| 2003/0225846 A1 | 12/2003 | Heikes et al. |
| 2003/0229900 A1 | 12/2003 | Reisman |
| 2004/0034867 A1* | 2/2004 | Rashkovskiy et al. ........... 725/40 |
| 2004/0060063 A1 | 3/2004 | Russ et al. |
| 2004/0064835 A1 | 4/2004 | Bellwood et al. |
| 2004/0078807 A1 | 4/2004 | Fries et al. |
| 2004/0078814 A1 | 4/2004 | Allen |
| 2004/0103167 A1 | 5/2004 | Grooters et al. |
| 2004/0117786 A1 | 6/2004 | Kellerman et al. |
| 2004/0210928 A1* | 10/2004 | Hamzy et al. .................... 725/31 |
| 2004/0255336 A1 | 12/2004 | Logan et al. ................... 725/135 |
| 2004/0255340 A1 | 12/2004 | Logan |
| 2004/0268386 A1 | 12/2004 | Logan et al. |
| 2005/0022241 A1 | 1/2005 | Griggs |
| 2005/0028208 A1 | 2/2005 | Ellis et al. |
| 2005/0044565 A1 | 2/2005 | Jerding et al. |
| 2005/0055710 A1 | 3/2005 | Aoki et al. |
| 2005/0076363 A1 | 4/2005 | Dukes et al. |
| 2005/0091316 A1 | 4/2005 | Ponce et al. |
| 2005/0149880 A1 | 7/2005 | Postrel |
| 2005/0210145 A1 | 9/2005 | Kim et al. |
| 2005/0246739 A1 | 11/2005 | Davidson |
| 2005/0251820 A1 | 11/2005 | Stefanik et al. |
| 2005/0262542 A1 | 11/2005 | DeWeese et al. |
| 2005/0278443 A1 | 12/2005 | Winner et al. |
| 2005/0278740 A1 | 12/2005 | Helms .............................. 725/41 |
| 2005/0278761 A1 | 12/2005 | Gonder et al. |
| 2005/0283813 A1 | 12/2005 | Jamail et al. |
| 2006/0005207 A1 | 1/2006 | Louch et al. |
| 2006/0020904 A1 | 1/2006 | Aaltonen et al. |
| 2006/0031882 A1 | 2/2006 | Swix et al. |
| 2006/0041927 A1 | 2/2006 | Stark et al. ..................... 725/139 |
| 2006/0059514 A1* | 3/2006 | Hsiao et al. ...................... 725/42 |
| 2006/0059526 A1 | 3/2006 | Poslinski |
| 2006/0075019 A1 | 4/2006 | Donovan et al. |
| 2006/0080408 A1 | 4/2006 | Istvan et al. .................... 709/219 |
| 2006/0090183 A1* | 4/2006 | Zito et al. ......................... 725/46 |
| 2006/0112325 A1 | 5/2006 | Ducheneaut et al. |
| 2006/0130093 A1* | 6/2006 | Feng et al. ....................... 725/39 |
| 2006/0143236 A1 | 6/2006 | Wu |
| 2006/0161950 A1 | 7/2006 | Imai et al. |
| 2006/0174277 A1 | 8/2006 | Sezan et al. |
| 2006/0184972 A1 | 8/2006 | Rafey et al. |
| 2006/0190966 A1 | 8/2006 | McKissick et al. |
| 2006/0195479 A1 | 8/2006 | Spiegelman et al. |
| 2006/0248557 A1 | 11/2006 | Stark et al. ..................... 725/37 |
| 2006/0253874 A1 | 11/2006 | Stark et al. ..................... 725/62 |
| 2006/0259926 A1 | 11/2006 | Scheelke et al. |
| 2006/0271959 A1 | 11/2006 | Jacoby et al. |
| 2006/0282856 A1 | 12/2006 | Errico et al. |
| 2007/0033533 A1 | 2/2007 | Sull |
| 2007/0061835 A1 | 3/2007 | Klein et al. |
| 2007/0106627 A1 | 5/2007 | Srivastava et al. |
| 2007/0123353 A1 | 5/2007 | Smith |
| 2007/0124795 A1 | 5/2007 | McKissick et al. |
| 2007/0150918 A1 | 6/2007 | Carpenter et al. |
| 2007/0186180 A1 | 8/2007 | Morgan |
| 2007/0186231 A1* | 8/2007 | Haeuser et al. .................. 725/25 |
| 2007/0186243 A1 | 8/2007 | Pettit et al. |
| 2007/0198532 A1 | 8/2007 | Krikorian et al. |
| 2007/0214473 A1 | 9/2007 | Barton et al. |
| 2007/0220566 A1 | 9/2007 | Ahmad-Taylor |
| 2007/0245367 A1 | 10/2007 | Ogawa |
| 2007/0256103 A1* | 11/2007 | Knudson ......................... 725/46 |
| 2007/0271338 A1 | 11/2007 | Anschutz |
| 2007/0277205 A1 | 11/2007 | Grannan |
| 2007/0282949 A1 | 12/2007 | Fischer et al. |
| 2007/0294726 A1 | 12/2007 | Drazin |
| 2007/0298401 A1 | 12/2007 | Mohanty et al. |
| 2008/0010153 A1 | 1/2008 | Pugh-O'Connor et al. |
| 2008/0022320 A1 | 1/2008 | Ver Steeg |
| 2008/0036917 A1 | 2/2008 | Pascarella et al. |
| 2008/0040370 A1 | 2/2008 | Bosworth et al. |
| 2008/0052371 A1 | 2/2008 | Partovi et al. |
| 2008/0065758 A1 | 3/2008 | Narayanaswami |
| 2008/0066111 A1 | 3/2008 | Ellis et al. |
| 2008/0066114 A1 | 3/2008 | Carlson et al. |
| 2008/0082606 A1 | 4/2008 | Gupta et al. |
| 2008/0086456 A1 | 4/2008 | Rasanen et al. |
| 2008/0092168 A1 | 4/2008 | Logan et al. |
| 2008/0098323 A1 | 4/2008 | Vallone et al. |
| 2008/0114861 A1 | 5/2008 | Gildred |
| 2008/0126936 A1 | 5/2008 | Williams ........................ 715/17 |
| 2008/0155600 A1 | 6/2008 | Klappert et al. ................ 725/44 |
| 2008/0163307 A1 | 7/2008 | Coburn et al. ................... 725/61 |
| 2008/0168506 A1 | 7/2008 | Pickelsimer |
| 2008/0168515 A1 | 7/2008 | Benson et al. |

(56) References Cited

U.S. PATENT DOCUMENTS

| | | |
|---|---|---|
| 2008/0177727 A1 | 7/2008 | Pickelsimer |
| 2008/0178218 A1 | 7/2008 | Pickelsimer |
| 2008/0235733 A1 | 9/2008 | Heie et al. |
| 2008/0247730 A1 | 10/2008 | Barton et al. |
| 2008/0263595 A1 | 10/2008 | Sumiyoshi et al. ............. 725/39 |
| 2008/0276278 A1 | 11/2008 | Krieger et al. ................. 725/40 |
| 2008/0288596 A1 | 11/2008 | Smith et al. |
| 2008/0313541 A1 | 12/2008 | Shafton et al. |
| 2008/0320139 A1 | 12/2008 | Fukuda et al. |
| 2009/0019374 A1 | 1/2009 | Logan et al. |
| 2009/0049098 A1 | 2/2009 | Pickelsimer et al. |
| 2009/0049118 A1 | 2/2009 | Stevens |
| 2009/0049473 A1 | 2/2009 | Pickelsimer et al. |
| 2009/0055743 A1 | 2/2009 | Pickelsimer et al. |
| 2009/0055868 A1 | 2/2009 | Wehmeyer et al. |
| 2009/0063994 A1 | 3/2009 | Pickelsimer et al. |
| 2009/0100469 A1 | 4/2009 | Conradt et al. |
| 2009/0125843 A1 | 5/2009 | Billmaier et al. |
| 2009/0172127 A1 | 7/2009 | Srikanth et al. |
| 2009/0172543 A1 | 7/2009 | Cronin et al. |
| 2009/0178081 A1 | 7/2009 | Goldenberg et al. |
| 2009/0199242 A1 | 8/2009 | Johnson et al. |
| 2009/0307719 A1 | 12/2009 | Clark et al. |
| 2009/0310933 A1 | 12/2009 | Lee |
| 2009/0313664 A1 | 12/2009 | Patil et al. |
| 2010/0042746 A1 | 2/2010 | Keum et al. |
| 2010/0064320 A1 | 3/2010 | Angiolillo et al. |
| 2010/0107194 A1 | 4/2010 | McKissick et al. |
| 2010/0175084 A1 | 7/2010 | Ellis et al. |
| 2010/0192173 A1 | 7/2010 | Mizuki et al. |
| 2011/0010744 A1 | 1/2011 | Stecyk et al. |
| 2011/0013885 A1 | 1/2011 | Wong et al. |
| 2011/0072455 A1 | 3/2011 | Pickelsimer et al. |
| 2011/0090402 A1 | 4/2011 | Huntington et al. |
| 2011/0107389 A1 | 5/2011 | Chakarapani |
| 2011/0131600 A1 | 6/2011 | Howcroft et al. |
| 2011/0138423 A1 | 6/2011 | Pickelsimer et al. |
| 2011/0202945 A1 | 8/2011 | Pickelsimer et al. |
| 2011/0283313 A1 | 11/2011 | Gathen et al. |
| 2012/0051717 A1 | 3/2012 | Nijim |
| 2012/0054808 A1 | 3/2012 | Nijim |
| 2012/0054810 A1 | 3/2012 | Nijim |
| 2012/0222056 A1 | 8/2012 | Donoghue et al. |
| 2012/0284744 A1 | 11/2012 | Kumar |
| 2013/0167168 A1 | 6/2013 | Ellis et al. |

OTHER PUBLICATIONS

Copending U.S. Appl. No. 12/868,824, filed Aug. 26, 2010 entitled "Playlist Bookmarking".
Copending U.S. Appl. No. 12/868,838, filed Aug. 26, 2010 entitled "Content Bookmarking".
U.S. Office Action dated Sep. 14, 2010 cited in U.S. Appl. No. 11/651,140.
U.S. Office Action dated Sep. 14, 2010 cited in U.S. Appl. No. 11/787,732.
U.S. Office Action dated Apr. 28, 2009 cited in U.S. Appl. No. 11/787,733.
U.S. Appl. No. 11/651,140, filed Jan. 9, 2007 entitled "Providing User Communication".
U.S. Appl. No. 11/787,732, filed Apr. 17, 2007 entitled "Providing a Video User Interface".
U.S. Appl. No. 11/787,733, filed Apr. 17, 2007 entitled "Providing a Lateral Search".
J. Bouwen et al., "Communication Meets Entertainment: Community Television," Technology White Paper, Alcatel Telecommunications Review, 1$^{st}$ Quarter 2005, pp. 1-8, http://www.alcatel.com/doctypes/articlepaperlibrary/pdf/ATR2005Q1/T0503-Community_TV-EN.pdf
U.S. Final Office Action dated Dec. 30, 2009 cited in U.S. Appl. No. 11/787,732.
Copending U.S. Appl. No. 12/545,099, filed Aug. 21, 2009 entitled "Providing a Video User Interface".
U.S. Appl. No. 12/126,025, filed May 23, 2008 entitled "Providing a Video User Interface".
U.S. Appl. No. 12/126,060, filed May 23, 2008 entitled "Providing a Social Network".
U.S. Appl. No. 12/126,096, filed May 23, 2008 entitled "Providing a Content Mark".
U.S. Appl. No. 12/126,126, filed May 23, 2008 entitled "Providing a User Interface".
Copending U.S. Appl. No. 12/959,731, filed Dec. 3, 2010 entitled "Providing a Media Guide Including Parental Information".
Copending U.S. Appl. No. 12/959,665, filed Dec. 3, 2010 entitled "Content Recommendations".
Copending U.S. Application No. 12/959,793, filed Dec. 3, 2010 entitled "Personalizing TV Content".
U.S. Final Office Action dated Jan. 14, 2011 cited in U.S. Appl. No. 12/126,096.
U.S. Office Action dated Oct. 5, 2010 cited in U.S. Appl. No. 12/126,096.
U.S. Final Office Action dated Dec. 22, 2010 cited in U.S. Appl. No. 11/651,140.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
U.S. Office Action dated Feb. 14, 2011 cited in U.S. Appl. No. 12/126,025.
U.S. Office Action dated Feb. 17, 2011 cited in U.S. Appl. No. 12/126,060.
U.S. Office Action dated Feb. 18, 2011 cited in U.S. Appl. No. 12/545,099.
U.S. Office Action dated Feb. 28, 2011 cited in U.S. Appl. No. 11/651,140.
U.S. Final Office Action dated Mar. 2, 2011 cited in U.S. Appl. No. 11/787,732.
U.S. Office Action dated Apr. 26, 2011 cited in U.S. Appl. No. 12/126,096.
U.S. Office Action dated Jun. 7, 2011 cited in U.S. Appl. No. 11/651,140.
U.S. Final Office Action dated Jun. 13, 2011 cited in U.S. Appl. No. 12/126,060.
U.S. Final Office Action dated Jun. 21, 2011 cited in U.S. Appl. No. 12/126,025.
U.S. Final Office Action dated Aug. 5, 2011 cited in U.S. Appl. No. 12/545,099.
U.S. Final Office Action dated Sep. 27, 2011 cited in U.S. Appl. No. 11/651,140.
U.S. Office Action dated Mar. 26, 2012 cited in U.S. Appl. No. 12/126,060, 26 pgs.
U.S. Office Action dated Dec. 28, 2011 cited in U.S. Appl. No. 12/545,099, 13 pgs.
U.S. Office Action dated Jan. 5, 2012 cited in U.S. Appl. No. 12/126,096, 20 pgs.
U.S. Office Action dated Jan. 18, 2012 cited in U.S. Appl. No. 12/126,025, 27 pgs.
U.S. Office Action dated Jan. 19, 2012 cited in U.S. Appl. No. 11/651,140, 21 pgs.
U.S. Final Office Action dated Aug. 15, 2012 cited in U.S. Appl. No. 12/126,025, 33 pgs.
U.S. Final Office Action dated Aug. 23, 2012 cited in U.S. Appl. No. 12/126,060, 30 pgs.
U.S. Final Office Action dated Aug. 29, 2012 cited in U.S. Appl. No. 12/868,838, 7 pgs.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.
U.S. Final Office Action dated Apr. 25, 2012 cited in U.S. Appl. No. 11/651,140, 21 pgs.
U.S. Office Action dated May 21, 2012 cited in U.S. Appl. No. 12/868,838, 22 pgs.
U.S. Office Action dated Jun. 5, 2012 cited in U.S. Appl. No. 12/126,126, 40 pgs.

(56) References Cited

OTHER PUBLICATIONS

U.S. Office Action dated Jun. 20, 2012 cited in U.S. Appl. No. 12/959,731, 30 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.
U.S. Office Action dated Sep. 13, 2012 cited in U.S. Appl. No. 11/651,140, 23 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Dec. 19, 2012 cited in U.S. Appl. No. 12/126,025, 30 pgs.
U.S. Final Office Action dated Dec. 28, 2012 cited in U.S. Appl. No. 12/126,126, 24 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Office Action dated May 22, 2013 cited in U.S. Appl. No. 11/651,140, 20 pgs.
U.S. Office Action dated Jun. 20, 2013 cited in U.S. Appl. No. 12/126,126, 27 pgs.
U.S. Final Office Action dated Feb. 26, 2013 cited in U.S. Appl. No. 11/651,140, 21 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Office Action dated Oct. 7, 2013 cited in U.S. Appl. No. 12/959,793, 27 pgs.
U.S. Final Office Action dated Oct. 10, 2013 cited in U.S. Appl. No. 12/126,126, 23 pgs.
U.S. Final Office Action dated Oct. 28, 2013 cited in U.S. Appl. No. 11/651,140, 19 pgs.
U.S. Office Action dated Oct. 29, 2013 cited in U.S. Appl. No. 12/126,060, 27 pgs.
U.S. Final Office Action dated Nov. 1, 2013 cited in U.S. Appl. No. 12/868,824, 15 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Office Action dated Mar. 6, 2014 in U.S. Appl. No. 12/959,731, 16 pgs.
U.S. Office Action dated Mar. 18, 2014 in U.S. Appl. No. 11/651,140, 18 pgs.
U.S. Office Action dated Mar. 21, 2014 in U.S. Appl. No. 12/868,824, 12 pgs.
U.S. Final Office Action dated Apr. 3, 2014 in U.S. Appl. No. 12/126,060, 18 pgs.
U.S. Office Action dated May 20, 2014 in U.S. Appl. No. 12/126,096, 19 pgs.
U.S. Office Action dated May 21, 2014 in U.S. Appl. No. 13/221,151, 18 pgs.

* cited by examiner

FIG.6 ical notation: $F_{(4, 25)}$...

PROVIDING A CUSTOMIZED USER INTERFACE

RELATED APPLICATIONS

Under provisions of 35 U.S.C. §119(e), Applicants claim the benefit of U.S. Provisional Application No. 60/946,790, filed Jun. 28, 2007, and U.S. Provisional Application No. 60/931,698, filed May 25, 2007, both of which are hereby incorporated by reference.

This application is a continuation-in-part (CIP) of U.S. application Ser. No. 11/787,732, filed Apr. 17, 2007, which is incorporated herein by reference. U.S. application Ser. No. 11/787,732, filed Apr. 17, 2007, claimed the benefit of U.S. Provisional Application No. 60/881,888, filed Jan. 23, 2007, and U.S. Provisional Application No. 60/897,341, filed Jan. 25, 2007, under provisions of 35 U.S.C. §119(e).

Related U.S. application Ser. No. 11/651,140, filed on Jan. 9, 2007, and U.S. application Ser. No. 11/787,733, filed on Apr. 17, 2007 are hereby incorporated by reference.

Related U.S. application Ser. No. 12/126,025, entitled "PROVIDING A VIDEO USER INTERFACE". U.S. application Ser. No. 12/126,060, entitled "PROVIDING A SOCIAL NETWORK", U.S. application Ser. No. 12/126,096, entitled "PROVIDING A CONTENT MARK", and U.S. application Ser. No. 12/126,126, entitled "PROVIDING A USER INTERFACE", filed on even date herewith in the name of Lisa A. Pickelsimer et al., assigned to the assignee of the present application, are also hereby incorporated by reference.

BACKGROUND

Service providers may deliver content to a user over a content delivery system. For example, conventional content delivery systems distribute the content to a first user and a second user independently. In other words, the first user may watch a sports program while the second user may simultaneously watch a video-on-demand program. Furthermore, service providers may provide along with the content, a grid-like guide showing what content is available at what time. Independent content use, however, does not create a socialized entertainment sense with the users. In addition, the grid-like guide provides very little interactive functionality. Consequently, the first user may be socially detached and isolated from the second user and the service provider. Stated another way, the conventional content delivery system may present an impersonal and unsocial user experience.

SUMMARY OF THE INVENTION

Consistent with embodiments of the present invention, systems and methods are disclosed for providing a user interface. First, a first input may be received and a currently displayed programming content may be shrunken. Next, the shrunken programming content may be displayed. Then, in response to the received first input and concurrent with the shrunken programming content, a media guide comprising at least three display elements may be displayed. At least one of the three display elements may be customized for a user. Each one of the three display elements may include a first content element, a second content element, a third content element, a fourth content element, or a fifth content element. The first content element may display available programming channels. The second content element may display what programs are available on the programming channels. The third content element may display description information for programs. The fourth content element may display actions that can be taken. The fifth content element may display an advertisement or information relative to one of the actions in the fourth content element.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. In conventional systems, service providers may provide along with the content, a grid-like guide showing what content is available at what time. The conventional grid-like guide, however, provides very little interactive functionality. Consequently, the first user may be socially detached and isolated from other users or the service provider. Consistent with embodiments of the invention, a user interface may be provided. First, a first input may be received and a currently displayed programming content may be shrunken. Next, the shrunken programming content may be displayed. Then, in response to the received first input and concurrent with the shrunken programming content, a media guide comprising at least three display elements may be displayed. At least one of the three display elements may be customized for a user. Each one of the three display elements may include a first content element, a second content element, a third content element, a fourth content element, or a fifth content element. Consequently, by using the media guide, the first user may be socially engaged with the service provider and other users thus creating a personalized experience.

Figure 1:
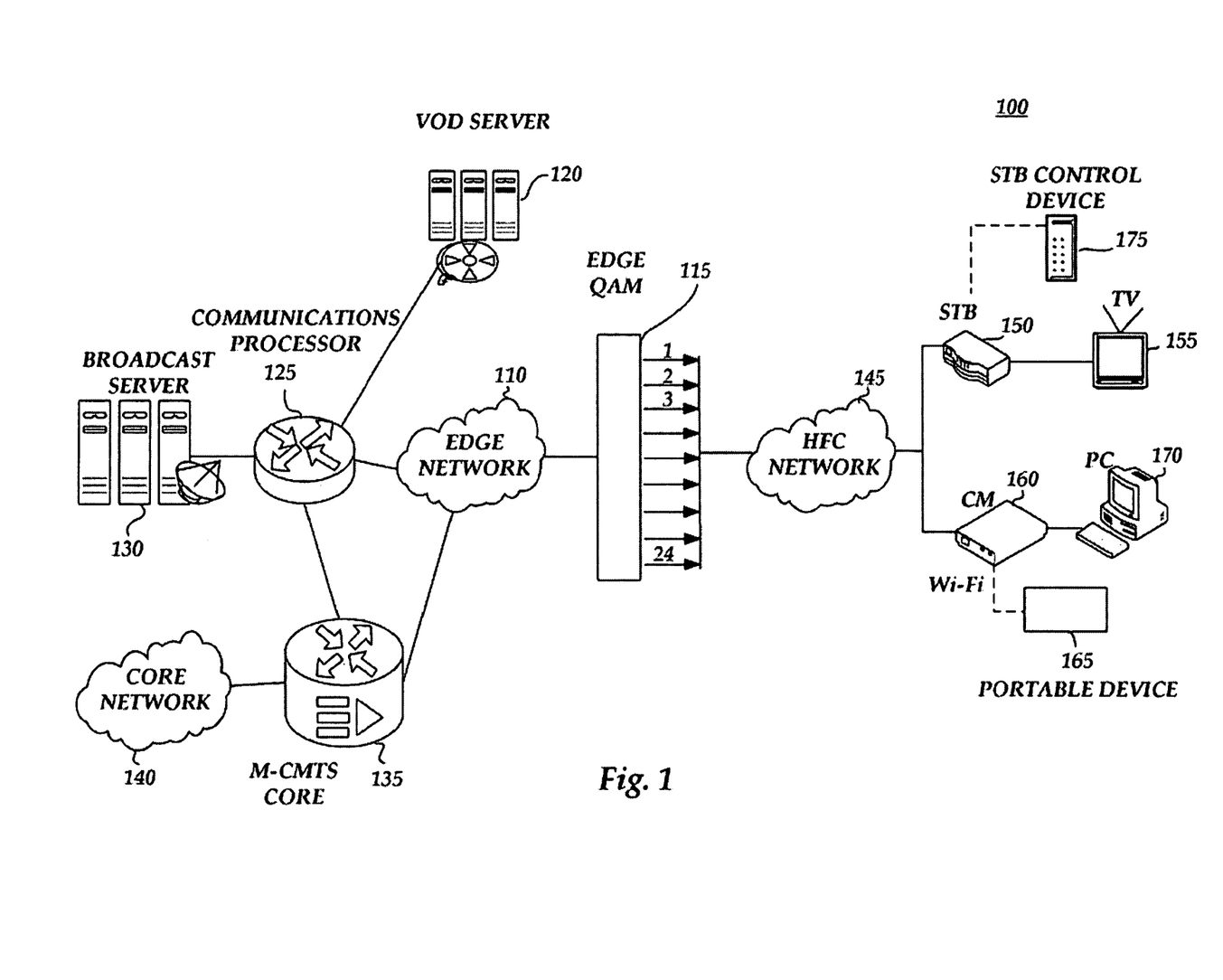
FIG. 1 is a block diagram of an operating environment including an application server.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communications processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing a user interface. The system may comprise a memory storage and a processing unit coupled to the memory storage. The processing unit may be operative to display a media guide comprising at least three display elements. At least one of the at least three display elements may be customized for a user. Each one of the at least three display elements may respectively include a first content element, a second content element, a third content element, a fourth content element, or a fifth content element. The first content element may be configured to display a plurality of available programming channels. The second content element may be configured to display a plurality of programs available on one of the plurality of available programming channels. The third content element may be configured to display description information corresponding to one of the plurality of programs. The fourth content element may be configured to display a plurality of actions that can be taken with respect to the one of the plurality of programs. The fifth content element may be configured to display an advertisement or information relative to one of the plurality of actions.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
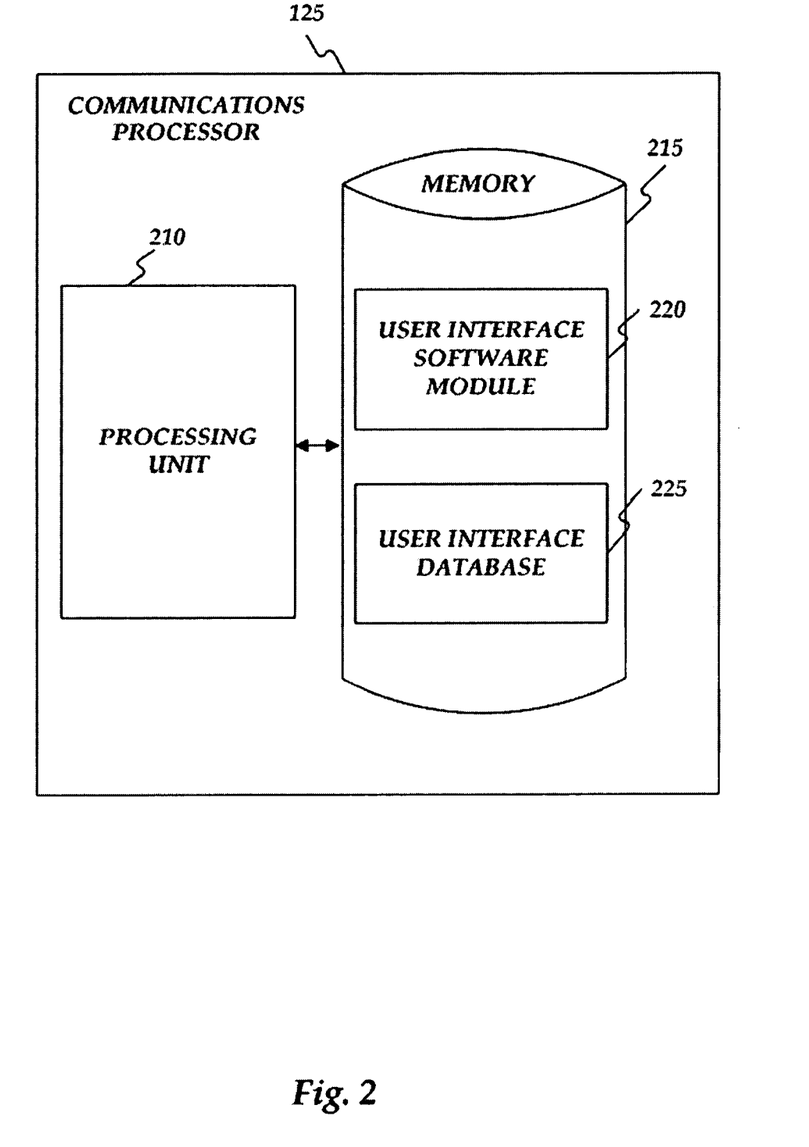
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a user interface software module 220 and a user interface database 225. While executing on processing unit 210, user interface software module 220 may perform processes for providing a user interface, including, for example, one or more stages included in method 300 described below with respect to FIG. 3. Furthermore, user interface software module 220 and user interface database 225 may be executed on or reside in any element shown in FIG. 1. Moreover, any one or more of the stages included in method 300 may be performed on any element shown in FIG. 1 including, but not limited to, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
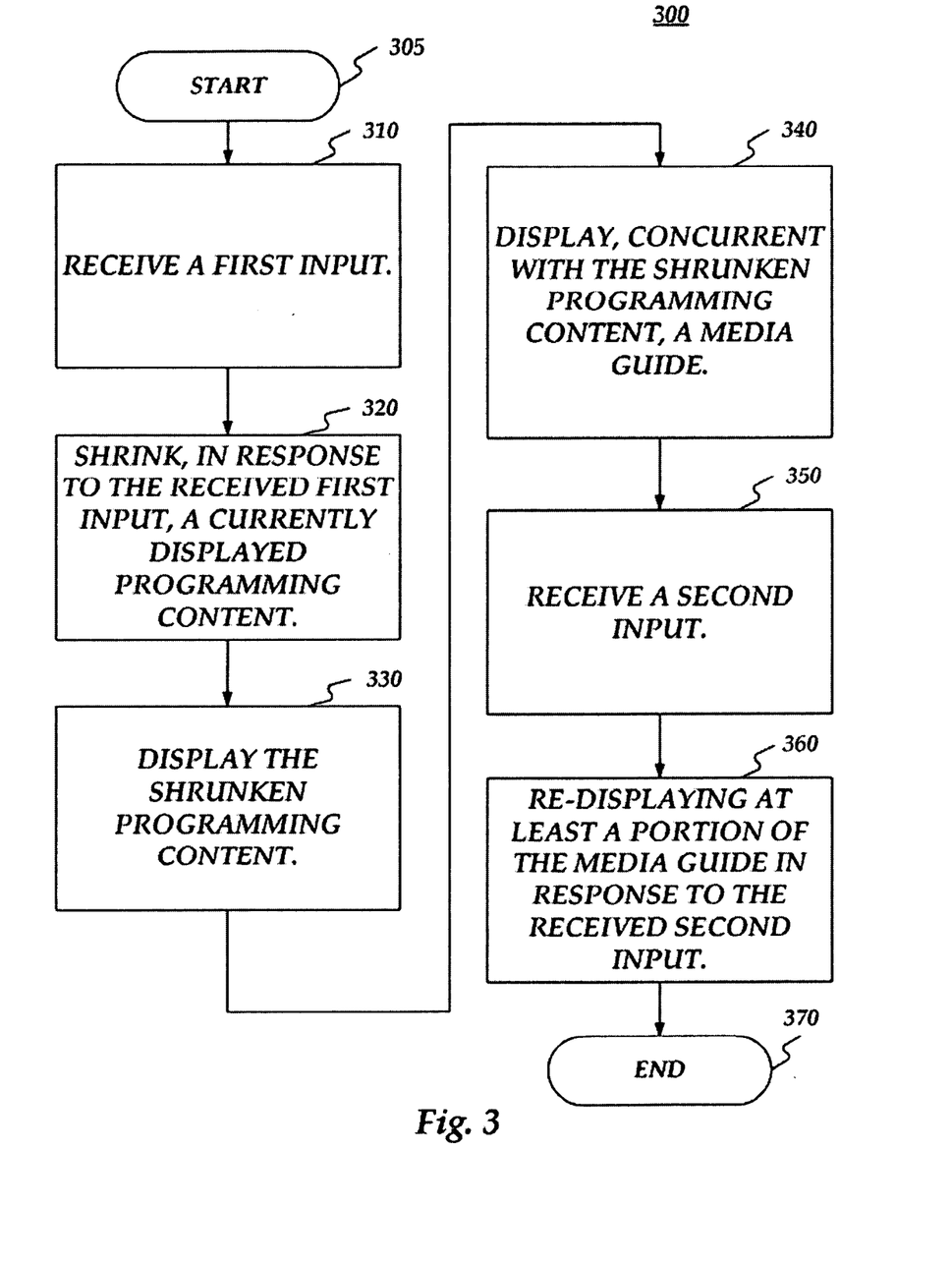
FIG. 3 is a flow chart of a method for providing a user interface.
Figure 4:
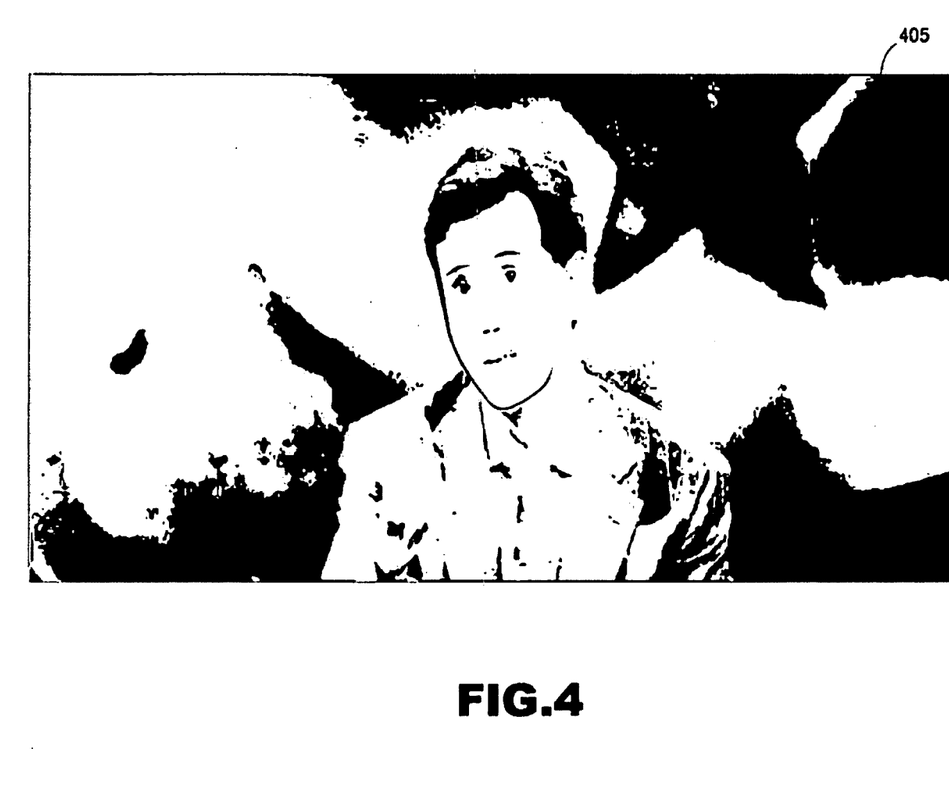
FIG. 4 is a diagram illustrating programming content.

FIG. 3 is a flow chart setting forth the general stages involved in a method 300 consistent with an embodiment of the invention for providing a user interface. Method 300 may be implemented using communications processor 125 as described in more detail above with respect to FIG. 2. Ways to implement the stages of method 300 will be described in greater detail below. Method 300 may begin at starting block 305 and proceed to stage 310 where communications processor 125 may receive a first input. For example, as shown in FIG. 4, a user may be viewing a programming content 405 on TV 155. While viewing programming content 405, the user may desire to use a media guide. Accordingly, the user may press a button on control device 175 associated with the media guide. Once the button is pressed, control device 175 may send the first input to STB 150 that may then send the first input to communications processor 125. Furthermore, as another example, a menu (not shown) may be placed on programming content 405 on TV 155. The user may then select, using control device 175, an element from the menu associated with the media guide. In response to the user selecting this element, STB 150 may send the first input to communications processor 125. The aforementioned are examples, and the user may view programming content 405 on any device including, but not limited to, portable device 165 and PC 170. Furthermore, the first input may be communicated to communications processor in any way.

Figure 5:
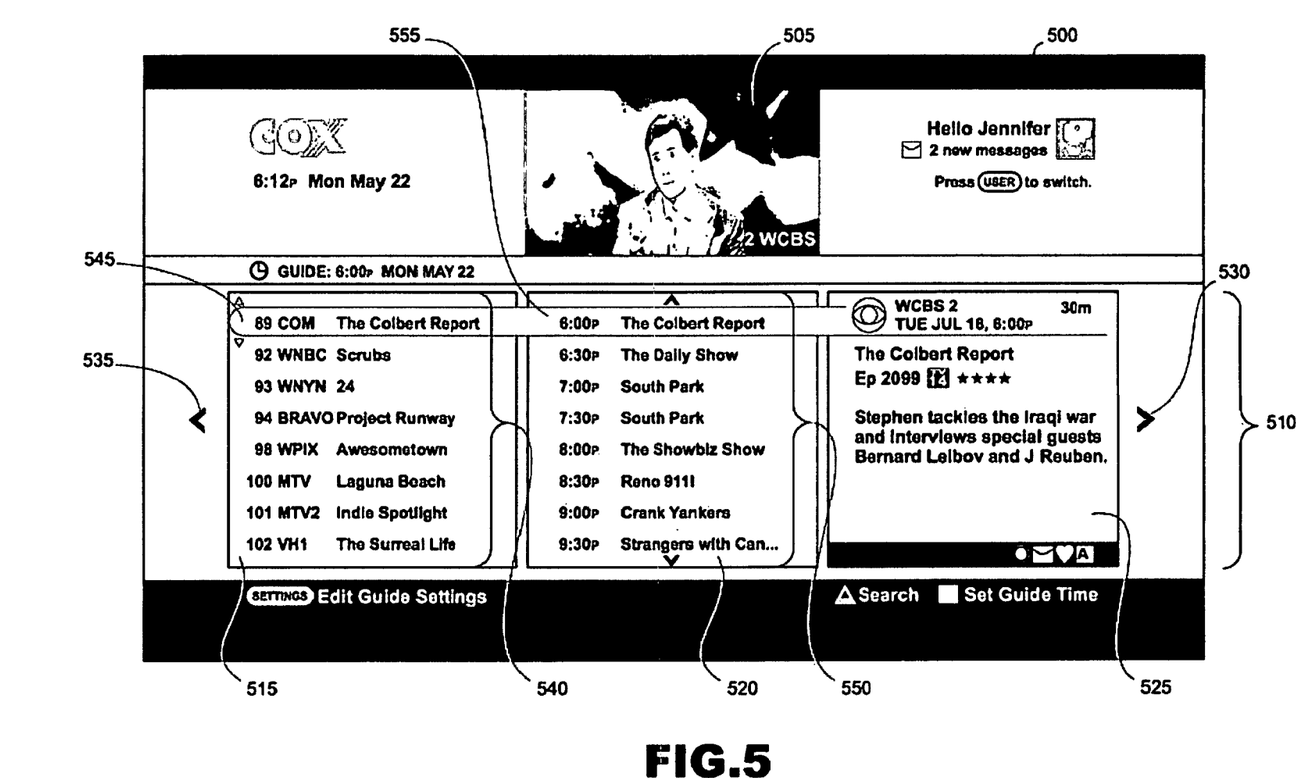
FIG. 5 is a diagram illustrating a media guide.

From stage 310, where communications processor 125 receives the first input, method 300 may advance to stage 320 where communications processor 125 may shrink currently displayed programming content 405. Once communications processor 125 shrinks currently displayed programming content 405 in stage 320, method 300 may continue to stage 330 where communications processor 125 may display a shrunken programming content 505 as shown in FIG. 5. For example, in response to the first input, communications processor 125 may display on TV 155 shrunken programming content 505. Shrunken programming content 505, for example, may comprise a shrunken version of programming content 405. Furthermore, shrunken programming content 505 may correspond to the currently selected program when the guide is first invoked (i.e., the guide comes up on time, on channel.) However, when the user navigates to other programming in the guide, new descriptive information may be provided in the third content element, but shrunken programming content 505 may remain on the channel the user was last viewing just prior to invoking the guide.

Figure 7:
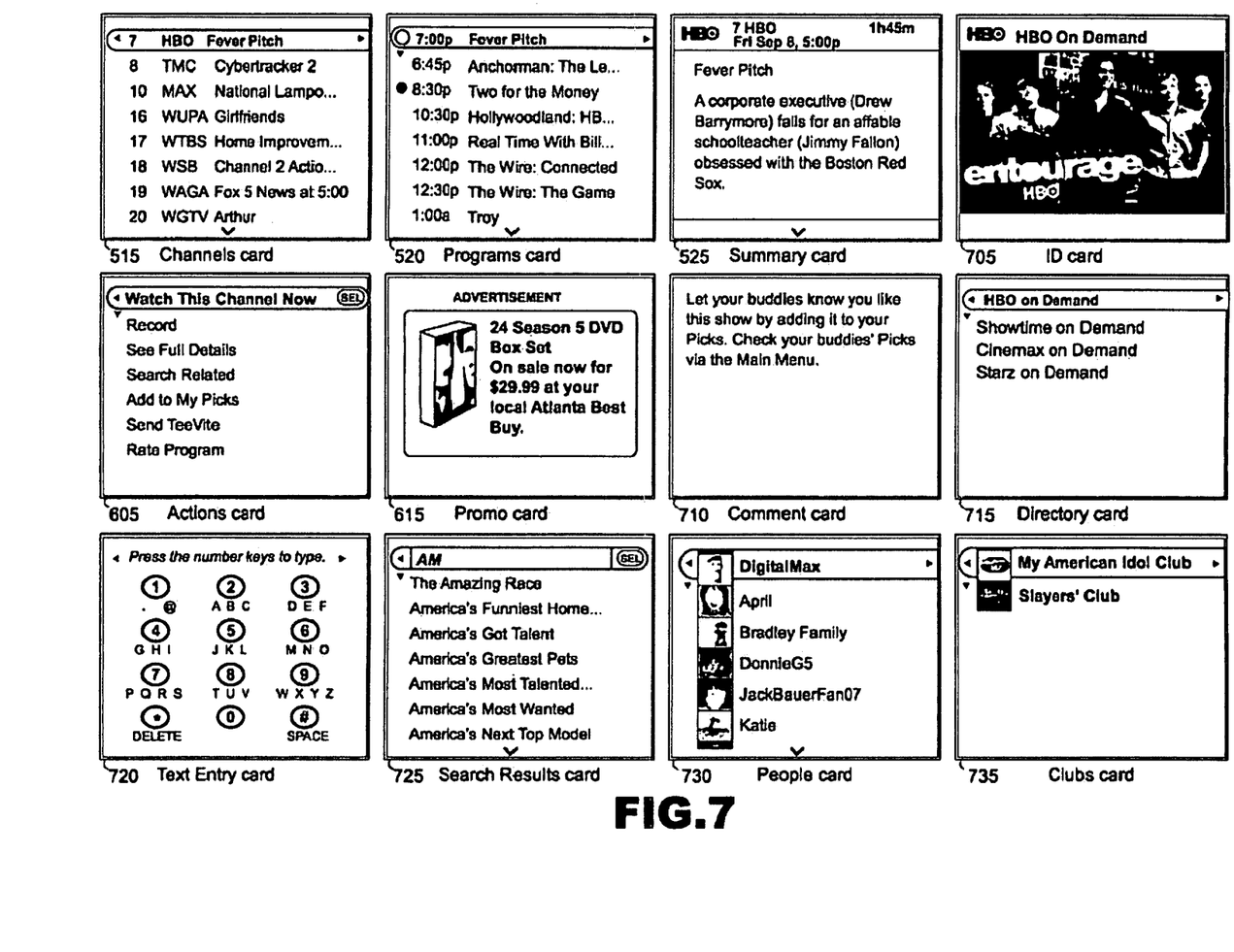
FIG. 7 shows a plurality of content element examples.

After communications processor 125 displays shrunken programming content 505 in stage 330, method 300 may proceed to stage 340 where communications processor 125 may display, in response to the received first input and concurrent with shrunken programming content 505, a media guide 510 as shown in FIG. 5. Shrunken programming content 505 and media guide 510 may be displayed in combination as display 500. Display 500, for example, may be configured to fit at least the width of a high-definition television (HDTV) display. Media guide 510 may comprise at least three display elements, for example, a first card 515, a second card 520, and a third card 525. While FIG. 5 shows three display elements, more than three may be used. For example, any of the at least three display elements may comprise a first content element, a second content element, a third content element, a fourth content element, and a fifth content element. The aforementioned five content elements will be described in more detail below. Furthermore, as will also be described in more detail below, FIG. 7 shows a plurality of content element examples that may be used consistent with embodiments of the invention.

Consistent with embodiments of the invention, at least one of the at least three display elements may be customized for a user. For example, as described in more detail below, a first card 515 in FIG. 5 shows an example of a first content element. The first content element may be configured to display a plurality of available programming channels 540 available, for example, from the service provider over content delivery system 100. At least one of the at least three display elements may be customized for a user. In other words, any one or more users may have their own corresponding customized display element.

Consistent with embodiments of the invention, the first content element may be customized to display a subset of the plurality of available programming channels 540. This subset may comprise a list of programming channels that the user likes to use. The subset may have been predetermined by the user. Moreover, this subset may be keyed to a user name (e.g. a user identifier) associated with the user. For example, when bringing up media guide 510, the user may enter the user's user name into STB control device 175, STB 150, TV 155, CM 160, portable device 165, or PC 170, for example. A combination of the user's user name and a subscriber identifier may be used to identify any display elements customized for the user. Any data needed to create display elements customized for the user may be stored locally on STB control device 175, STB 150, TV 155, CM 160, portable device 165, or PC 170 or may be stored remotely on communications processor 125 or anywhere else. The subscriber identifier may comprise a media access control (MAC) address of a device (e.g. STB 150, TV 155, CM 160, portable device 165, PC 170, etc.) serving a display device (e.g. TV 155, portable device 165, PC 170, etc.) on which media guide 510 is displayed.

As stated above, when identifying the user, a user name and a subscriber identifier (e.g. MAC address) may be used. For example, the MAC address may be transmitted to a provisioning system (not shown) that may resolve the MAC address into, for example, a customer account for the user. Embodiments of the invention may be able to identify individuals (e.g. users), consequently, the MAC address may be accompanied by some other information (e.g. the user name.) The MAC address plus user name may be resolved by the provisioning system that may identify a particular user.

The aforementioned example is not limited to displaying customized programming channel lists, but may also include others such as lists for digital video recorder (DVR) recordings received, for example, from VOD server 120. For example, DVR recordings may be stored on a single hard drive (e.g. on STB control device 175, STB 150, TV 155, CM 160, portable device 165, or PC 170.) All users within a household, for example, may record content (e.g. shows) to the single hard drive. However, when the user wishes to view DVR recording for the user's personal collection, even though all DVR recording are on the single hard drive, media guide 510 customized for the user may only list the user's personal collection of DVR recordings.

Furthermore, parental control functions may be associated with a particular "parent" user. The parent user may have certain parental control functions over other users in a household associated with the parent user. In this case, the parent user's customized media guide may be password protected. For example, in addition to entering the aforementioned user name, with the parent user, a password may also be required.

As stated above, first card 515 in FIG. 5 shows an example of the first content element. The first content element may be configured to display a plurality of available programming channels 540 available, for example, from the service provider over content delivery system 100. A selected one of the plurality of available programming channels 545 may correspond to programming content currently displayed (e.g. shrunken programming content 505.) Additional programming channels may be displayed in the first content element by scrolling the first content element.

Second card 520 in FIG. 5 shows an example of a second content element. The second content element may be configured to display a plurality of programs 550 available, for example, on selected one of the plurality of available programming channels 545. In addition, the second content element may be configured to display the plurality of programs available during, for example, a predetermined time period. As shown in FIG. 5, the second content element shows plurality of programs 550 available between 6:00 PM and 9:30 PM on selected one of the plurality of available programming channels 545. A program 555, within plurality of programs 550, corresponding to programming content currently displayed (e.g. shrunken programming content 505) may be highlighted.

Third card 525 in FIG. 5 shows an example of a third content element. The third content element may be configured to display description information corresponding to one of the plurality of programs. For example, the third content element shown in FIG. 5 shows description information corresponding to selected one of the plurality of available programming channels 545. In other words, the description information in the third content element may describe what was, is, or will be presented in program 555. As will be described in greater detail below, the description information displayed in the third content element may be toggled between varying degrees of less detailed information and more detailed information.

Figure 6:
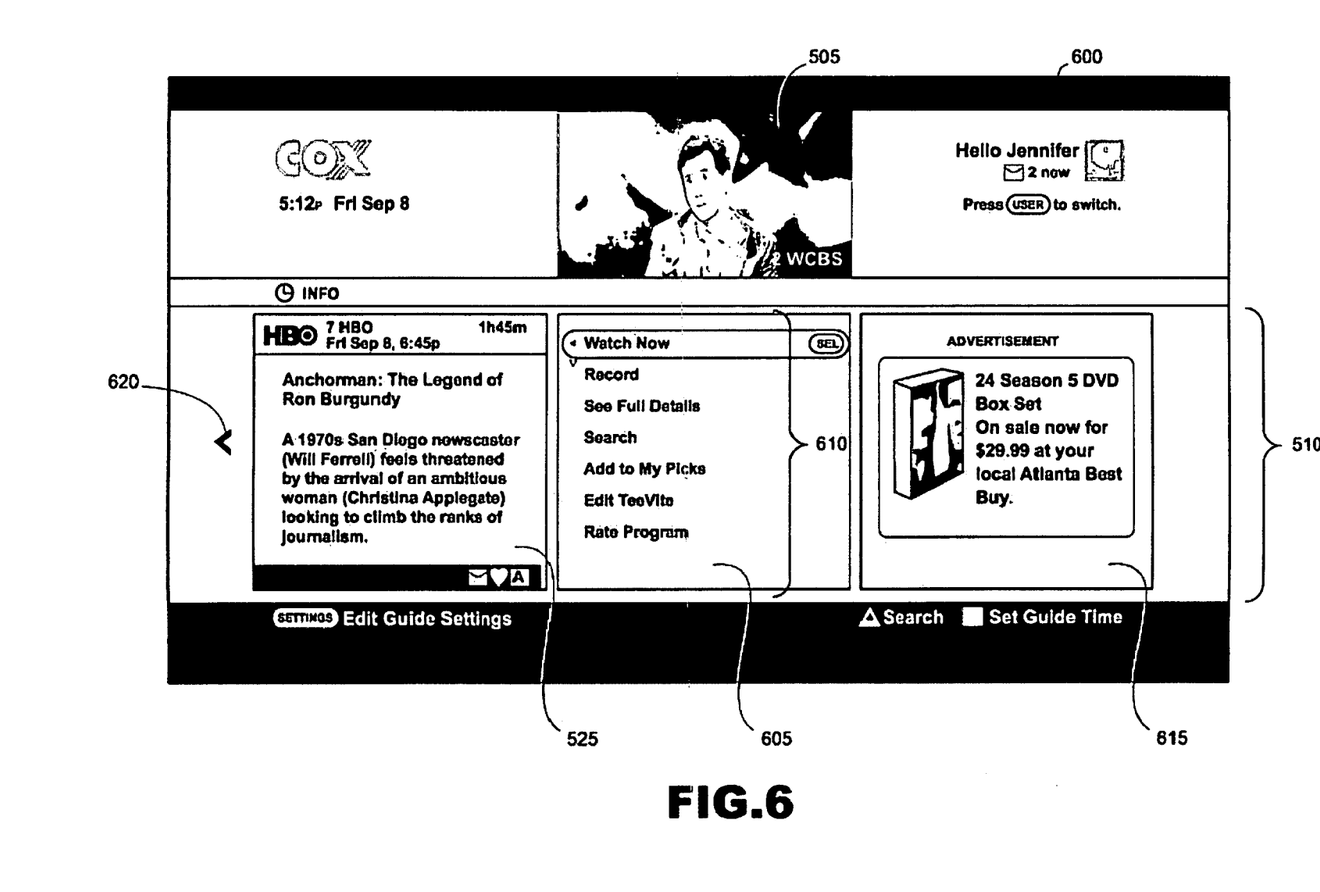
FIG. 6 is a diagram illustrating another media guide.

FIG. 6 shows another example of a display as display 600 including shrunken programming content 505 and media guide 510. Display 600 shows examples of the aforementioned fourth content element and fifth content element. As shown in FIG. 6. fourth card 605 shows an example of the fourth content element. The fourth content element may be configured to display a plurality of actions 610 that can be taken with respect to one of the plurality of programs (e.g. program 555.) For example, plurality of actions 610 may comprise, but are not limited to, a watch now action, a record action, a see full details action, a search action, an add to my picks action, a send an invitation action, and a rate program action. Selecting the watch now action may display content associated with a program selected in second card 520. Selecting the record action may cause a program selected in second card 520 to be recorded. In addition, selecting the see full details action may cause full details associated with a program selected in second card 520 to be displayed. Long description information associated with the full details may comprise an overlay rather than being displayed in the third content element because more space may be used to display all of the information. Deselecting the see full details action may cause a short version of the details to be displayed in third card 525. Selecting the search action may cause a lateral search to be performed relative to a program selected in second card 520. The search action may allow the user to find related shows. Furthermore, the search may allow the user to find the next time a program selected in second card 520 is airing so that the user could set a recording. Or the user may like a program selected in second card 520 and may use the search action to find similar programs in hopes of finding desirable content.

In addition, the user may find a program selected in second card 520 very desirable. Consequently, the user may wish to select the add to my picks action so that the user's friends (e.g. buddies that the user has previously identified) can see that the user likes the program selected in second card 520. Accordingly, one of the user's friends might have an interest in viewing the program selected in second card 520. In addition, the user may send an recommendation to a particular friend who the user believes may have an interest in the program selected in second card 520. Selecting the send an invitation action may allow the user to send this recommendation. Furthermore, selecting the rate program action may allow the user to give their own rating or opinion regarding the program selected in second card 520.

Fifth card 615 in FIG. 6 shows an example fifth content element. The fifth content element may be configured to display, for example, an advertisement or information relative to one of the plurality of actions. For example, the service provider may configure the fifth content element to display an advertisement for goods or services related to the selected programming from 520. The advertisement may offer for sale merchandise related to the selected programming from 520. For example, if the selected programming from 520 includes a sporting event, the fifth content element may display an advertisement for team logo merchandise for teams in the sporting event. Furthermore, the advertisement may show upcoming programs to be presented on selected one of the plurality of available programming channels 545. Notwithstanding, the fifth content element may be configured to display any advertisement.

Furthermore, the fifth content element may be configured to display, for example, information relative to the one of the plurality of actions selected in the fourth content element. The information may provide instructions on performing one of the plurality of actions selected in the fourth content element. For example, if the selected action in the fourth content element, is simple (e.g. a watch now action), the fifth content element may be configured to display an advertisement. However, if the selected action in the fourth content element is more complicated, the fifth content element may be configured to display instructions on performing the selected action. For example, if the selected action in the fourth content element comprises a search action, then the fifth content element may be configured to display instructions on performing the search action.

From stage 340, where communications processor 125 displays media guide 510, method 300 may advance to stage 350 where communications processor 125 may receive a second input. For example, communications processor 125 may receive the second input in response to the user selecting (e.g. using control device 175) a first user selectable element 530 as shown if FIG. 5 or a second user selectable element 620 as shown in FIG. 6.

Once communications processor 125 receives the second input in stage 350, method 300 may continue to stage 360 where communications processor 125 may re-display at least a portion of media guide 510. For example, If the user selects first user selectable element 530 twice, the cards shown in FIG. 5 may scroll to the left two places. As a result, third card 525 may shift (scroll) from the right-most position (as shown in FIG. 5) to the left-most position (as shown in FIG. 6.) In this way, media guide 510 may be re-displayed with different ones of the first content element, the second content element, the third content element, the fourth content element, and the fifth content element filling the at least three display elements comprising media guide 510. Furthermore, if the user selects a third user selectable element 535 as shown in FIG. 5, programming content 405 on TV 155 may be redisplayed thus showing a full view of the content (e.g. instead of shrunken programming content 505), removing media guide 510 from view and introducing a main menu. If the user selects a fourth user selectable element 535, the main menu may be removed and a full view of programming content 405 may be visible. Once communications processor 125 re-displays at least a portion of media guide 510 in stage 360, method 300 may then end at stage 370.

FIG. 7 shows a plurality of content element examples. The plurality of content element shown in FIG. 7 are examples and others may be used. As described above, FIG. 7 shows examples of first card 515, second card 520, third card 525, fourth card 605, and fifth card 615. In addition, FIG. 7 shows examples of a sixth card 705, a seventh card 710, an eighth card 715, a ninth card 720, a tenth card 725, an eleventh card 730, and a twelfth card 735. Consistent with embodiments of the invention, there may be two types of cards, list cards and information cards. Any of the plurality of content elements shown in FIG. 7 may be used and tabbed through the three display elements as described above with respect to FIG. 3.

As described above, list cards may contain list items and optionally may contain icons. Lists items and icons may always be selectable. For example, first card 515 may comprise a channel card containing a list of channels. Second card 520 may comprise a program card containing a list of programs found on a particular channel. Eighth card 715 may comprise a directory card containing a list of directories. For example, an "On Demand" branch can have FreeZone, Premium Networks, and Movies on Demand directories that in turn can have their own subdirectories. Tenth card 725 may comprise a search results card that may comprise a special type of list card that may contain a search text box at the top and list items at the bottom. Eleventh card 730 may comprise a people card containing a list of users in a household or buddies. Each item in eleventh card 730 may be supplemented with an avatar or icon. Twelfth card 735 may comprise a club card that may be similar to the people card except that it may contain a list of clubs.

Information cards may contain static information such as a summary of a program, instructional text, or an ID of a program. Information cards may not be selectable. For example, third card 525 may comprise a summary card containing information about objects such as broadcast programs or interactive television applications. Sixth card 705 may comprise an ID card containing branding and promotional information for entities that may: i) have special client driven display needs; or ii) have a child tree. On Demand channels may be an example of an object with an ID card. ID cards may be, for example, signposts in the tree. Seventh card 710 may comprise a comment card contain tooltip-style help text and status information about a particular leaf-level action. For example, the comment card for a "Send An Interactive TV Invitation" action may at first explain the feature, then after the invitation has been sent, display when it was sent and to whom. Most, but not all leaf-level actions have comment cards. Actions without comment cards may be referred to as terminal. Fifth card 615 may comprise a promo card containing advertising or other promotional information. Promo cards may appear in context with actions that do not have an associate comment card (e.g., Watch Now in the Guide.) Ninth card 720 may comprise a text entry card containing a keyboard representation. In this example, a number pad may be represented on the card. The first child of the text entry card may be a selected form field. When the user types using, for example, a number key on device 175, the typing may appear in a text field.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a customized user interface, the method comprising:
    identifying a user associated with a first input;
    displaying, in response to identifying the user associated with the first input, at least one customized media guide comprising a plurality of display elements, wherein displaying the at least one customized media guide comprising the plurality of display elements comprises displaying:
        a first display element comprising description information corresponding to a selected one of a plurality of programs, wherein the plurality of programs are displayed in response to a user selection of one of a plurality of available programming channels displayed in an instance of the customized media guide,
        a second display element displayed to the right of the first display element and comprising a plurality of actions that can be taken with respect to the selected one of the plurality of programs, and
        a third display element displayed to the right of the second display element and comprising instructional information associated with a selected one of the plurality of actions when the selected one of the plurality of actions requires the instructional information to be displayed, and wherein the third display element is further configured to display an advertisement for one of goods and services corresponding to a currently displayed programming content when the selected one of the plurality of actions does not require the instructional information to be displayed.

2. The method of claim 1, wherein displaying the customized media guide in response to the first input comprises displaying the customized media guide in response to the first input, wherein the first input being received in response to the user selecting a menu element from a displayed menu.

3. The method of claim 1, wherein displaying the first display element comprising the description information corresponding to the selected one of the plurality of programs comprises:
    receiving a selection of a programming channel from the plurality of available programming channels of the customized media guide; and
    displaying the plurality of programs available on the selected programming channel, and displaying the description information corresponding to the selected one of the plurality of programs wherein the selected one of the plurality of available programming channels corresponds to programming content currently being displayed.

4. The method of claim 3, wherein displaying the plurality of programs comprises displaying the plurality of programs available during a predetermined time period.

5. The method of claim 1, wherein displaying the second display element comprising the plurality of actions comprises displaying the second display element comprising the plurality of actions wherein the plurality of actions comprises at least two of the following: a watch now action, a record action, see full details action, a search action, an add to my picks action, a send an invitation action, and a rate program action.

6. The method of claim 1, wherein identifying the user comprises identifying the user based upon a subscriber identifier.

7. The method of claim 1, wherein identifying the user comprises identifying the user based upon a subscriber identifier and a user identifier.

8. The method of claim 7, wherein identifying the user based upon the subscriber identifier comprises identifying the user based upon a media access control (MAC) address of a device serving a display device on which the media guide is displayed.

9. The method of claim 1, further comprising determining whether the user is enabled to make changes in parental control functions based upon a subscriber identifier and a user identifier, the subscriber identifier comprising a media access control (MAC) address of a device serving a display device on which the media guide is displayed.

10. A computer-readable non-transitory medium which stores a set of instructions which when executed performs a method for providing a user interface, the method executed by the set of instructions comprising:
  receiving a first input;
  identifying a user associated with the first input;
  shrinking, in response to the received first input, a currently displayed programming content;
  displaying the shrunken programming content; and
  displaying, in response to identifying the user associated with the first input and concurrent with the shrunken programming content, a customized media guide comprising a plurality of display elements, wherein each of the plurality display elements are respectively displayed as a card that is repositionable within the customized media guide upon a user command to reposition the card within the customized media guide, and wherein displaying the plurality of display elements comprises displaying:
    a first display element comprising description information corresponding to a selected one of a plurality of programs, wherein the plurality of programs are displayed in response to a user selection of one of a plurality of available programming channels displayed in the customized media guide,
    a second display element displayed to the right of the first display element and comprising a plurality of actions that can be taken with respect to the selected one of the plurality of programs, and
    a third display element displayed to the right of the second display element and comprising instructional information associated with a selected one of the plurality of actions when the selected one of the plurality of actions requires the instructional information to be displayed, and wherein the third display element is further configured to display an advertisement for one of goods and services corresponding to a currently displayed programming content when the selected one of the plurality of actions does not require the instructional information to be displayed.

11. A computer-readable non-transitory medium of claim 10, wherein displaying the customized media guide comprises displaying the customized media guide wherein at least one of the plurality of display elements being customized for the user is identified as being associated with the user based upon a subscriber identifier.

12. A computer-readable non-transitory medium of claim 11, wherein identifying the user comprises identifying the user based upon the subscriber identifier and a user identifier.

13. A computer-readable non-transitory medium of claim 12, wherein the subscriber identifier comprises a media access control (MAC) address of a device serving a display device on which the customized media guide is displayed.

14. A computer-readable non-transitory medium of claim 11, further comprising enabling changes in parental control functions based upon the subscriber identifier and a user identifier, the subscriber identifier comprising a media access control (MAC) address of a device serving a display device on which the customized media guide is displayed.

15. A computer-readable non-transitory medium of claim 10, further comprising:
  receiving a second input; and
  in response to receiving the second input, re-displaying at least a portion of the customized media guide wherein a one of the plurality of display elements is in a different configuration.

16. A computer-readable non-transitory of claim 10, wherein one of the plurality of available programming channels corresponds to programming content currently displayed.

17. A system for providing a user interface, the system comprising:
  a memory storage; and
  a processing unit coupled to the memory storage, wherein the processing unit is operative to:
    receive a request to display a media guide;
    identify a user providing the request based upon a subscriber identifier and a user identifier, the subscriber identifier comprising a media access control (MAC) address of a device providing the media guide, the user being associated with a customized media guide element;
    display a customized media guide comprising a plurality of display elements, wherein each of the plurality of display elements have reconfigurable positions within the media guide, wherein displaying the customized media guide comprising the plurality of display elements comprises displaying:
      a first display element configured to display description information corresponding to a selected one of a plurality of programs, wherein the plurality of programs are displayed in response to a user selection of one of a plurality of available programming channels displayed in the customized media guide;
      a second display element displayed to the right of the first display element and configured to display a plurality of actions that can be taken with respect to the selected one of the plurality of programs; and
      a third display element displayed to the right of the second display element and configured to display instructional information related to the selected one of the plurality of actions, when the selected one of the plurality of actions requires the instructional information to be displayed, and wherein the third display element is further configured to display an advertisement for one of goods and services corresponding to a currently displayed programming content when the selected one of the plurality of actions does not require the instructional information to be displayed.

* * * * *

UNITED STATES PATENT AND TRADEMARK OFFICE
CERTIFICATE OF CORRECTION

PATENT NO. : 8,789,102 B2  Page 1 of 1
APPLICATION NO. : 12/126165
DATED : July 22, 2014
INVENTOR(S) : Lisa A. Pickelsimer et al.

It is certified that error appears in the above-identified patent and that said Letters Patent is hereby corrected as shown below:

IN THE CLAIMS:

Column 14, line 33, claim 16, "non-transitory" should read --non-transitory medium--.

Signed and Sealed this
Second Day of June, 2015

Michelle K. Lee
*Director of the United States Patent and Trademark Office*